United States Patent [19]

Nichols, Jr. et al.

[11] 4,419,369

[45] Dec. 6, 1983

[54] PROTEIN MINERAL DIETARY MODULE

[75] Inventors: Buford L. Nichols, Jr., Houston, Tex.; William J. Klish, Rochester, N.Y.; Vivian E. Potts, Houston, Tex.

[73] Assignee: Baylor College of Medicine, Houston, Tex.

[21] Appl. No.: 414,085

[22] Filed: Sep. 1, 1982

Related U.S. Application Data

[63] Continuation-in-part of Ser. No. 189,269, Sep. 22, 1980, abandoned, which is a continuation-in-part of Ser. No. 83,187, Oct. 9, 1979, abandoned.

[51] Int. Cl.$^3$ ............................ A23J 3/00; A23L 1/30
[52] U.S. Cl. ......................................... 426/2; 426/74; 426/656; 426/657; 426/801
[58] Field of Search ................... 426/74, 656, 657, 2, 426/648, 801, 285, 454

[56] References Cited

U.S. PATENT DOCUMENTS

| | | | |
|---|---|---|---|
| 2,295,643 | 9/1942 | Emery et al. | 426/74 |
| 2,372,476 | 3/1945 | Elmslie | 426/74 |
| 2,512,537 | 6/1950 | Zellers | 426/74 |
| 3,097,947 | 7/1963 | Kemmerer | 426/74 |
| 3,901,979 | 8/1975 | Nagasawa et al. | 426/801 X |
| 4,175,121 | 11/1979 | Mantha | 426/2 X |
| 4,282,265 | 8/1981 | Thever | 426/801 X |
| 4,303,692 | 12/1981 | Gaull | 426/2 X |

*Primary Examiner*—Robert A. Yoncoskie
*Attorney, Agent, or Firm*—Fulbright & Jaworski

[57] ABSTRACT

Disclosed is an improved dietary protein mineral module composed of a high quality protein, such as calcium-sodium caseinate, and electrolytes (minerals) combined in a fixed ratio so that when the protein concentration in water is 2.2 g/100 cc (a normal concentration) the normal mineral requirements are met and in which the dietary acid content (chloride) is reduced to a maximum of 2.0% dry weight and there is increased phosphorus content (a minimum of 1.0% up to 4.0% dry weight). The improved module has been quite successful in treating specific problems in infants who have not responded well to any of the existing commercial formulas. These include: acquired monosaccharide intolerance or intractable diarrhea of infancy; weaning from total parental nutrition; alteration of the renal solute load in infants with renal or congenital heart disease; and prevention of acidosis in infants thereby resulting in better growth.

7 Claims, No Drawings

PROTEIN MINERAL DIETARY MODULE

CROSS-REFERENCE TO RELATED APPLICATIONS

The present application is a continuation-in-part of application Ser. No. 189,268 filed Sept. 22, 1980, abandoned in favor of this application, which in turn is a continuation-in-part of application Ser. No. 083,187, filed Oct. 9, 1979, abandoned in favor of application Ser. No. 189,269.

BACKGROUND OF THE INVENTION

As pointed out in our publication entitled "Modular Formula: An Approach to Management of Infants with Specific or Complex Food Intolerances" published in Volume 88, No. 6 at pp. 948–952 of the Journal of Pediatrics, June, 1976, the basic modular components of an infant formula are protein, fat, carbohydrate, minerals, vitamins, and water. With existing proprietary infant formulas, the physician can not limit changes to one of the components when a new formula is desired but is obliged to change several of them. As an understanding of chronic diarrheal disease increases, it is becoming obvious that infants can develop complex intestinal intolerances. Carbohydrate malabsorption can be present simply as an intolerance to lactose or as an intolerance to all carbohydrates including glucose. A fermentative diarrhea results if the ingested sugar is not altered to correspond to the ability of the intenstine to absorb it. Chronic diarrhea may lead to a depletion of the bile acid pool (personal observation), causing maldigestion of long-chain fats. Specific protein hypersensitivity may go undetected because of the overlap of symptoms associated with other nutrient intolerances.

This publication discloses and sets forth a report of our early work in providing a modular formula (original module) comprised of protein in the form of calcium sodium caseinate and electrolytes which was usually used in a concentration of 3 gm of core mix per 100 ml of water which provides 2.2 gm of protein and essentially the same minerals found in most commercial formulas. As pointed out in this publication, the physician may add fat of any nature and in any quantity that he considers desirable with final concentrations ranging between 3.5 and 4.5 gm/100 ml, and the type and amount of carbohydrate to be added are determined by the gastrointestinal tolerance of the individual patient, with final concentrations ranging between 5 and 7 gm/100 ml.

We have found, however, that substantially improved results are obtained by significantly altering and improving the original modular or core formula disclosed in the above publication. This includes decreasing the dietary acid content, that is, chloride to a maximum of 2.0% dry weight, and providing a better and more effective array of minerals by providing a minimum of 1.0% dry weight phosphorus (improved module).

U.S. Pat. No. 1,302,436 to Dunham, discloses a preparation of a core formula composed of a mixture of casein and oil, which may be mixed with water to form a cream substitute, or added to milk to enrich the same; however, there is no mention made for a use of this preparation as a module or core formula and one particularly for infants.

U.S. Pat. No. 3,901,979 to Nagasawa, discloses a process for preparing a low sodium infant formula mixture containing a casein micelle to which may be added fat, emulsifier, carbohydrates and mineral nutrition elements such as vitamins.

U.S. Pat. No. 2,611,706 to Bernhart et al, shows a milk-based food product consisting of skim cow's milk, sodium caseinate, lactose and fat components as set forth in Table II.

U.S. Pat. Nos. 891,336; 1,450,836; and 1,607,844 discloses infant formulas containing four components such as casein, oil, carbohydrates and minerals.

U.S. Pat. Nos. 750,832 and 3,995,070 disclose processes for preparing food casein having a suggested utility in infant formulations.

U.S. Pat. Nos. 1,341,040; 1,557,053; 1,767,185; and 2,682,467 are of general interest and are representative of the state of the art.

Other references are of record in our prior applications.

None of the foregoing patents disclose the improved dietary food module or modular or core formula of the present invention by which advantageous results are obtained.

SUMMARY OF THE INVENTION

The present invention is directed to a dietary protein mineral module or modular or core formula composed of a high quality protein, such as calcium-sodium caseinate, and electrolytes (minerals) combined in a fixed ratio so that when the protein concentration is 2.2 gm/100 cc (a normal concentration) the normal mineral requirements are met and which has an improved array of minerals of reduced dietary acid content (a maximum of 2.0% chloride by weight) thereby providing improved results including a better tolerance to patients, and particularly infants fed the formula.

More particularly, the present invention is directed to a dietary protein mineral module or core formula which is comprised of a high quality protein and an improved array of minerals or electrolytes of reduced dietary acid content in the proportions hereinafter set forth by which improved results are obtained including increased tolerance of the patient over prior art dietary modular formulas, such as disclosed in the "Journal of Pediatrics", Supra.

It is therefor an object of the present invention to provide a dietary protein mineral module or modular or core formula of reduced dietary acid content by which better tolerance of the patient is obtained.

Yet a further object of the present invention is the provision of such a dietary module or modular or core formula in which a high quality protein, such as calcium-sodium caseinate, and an improved array of electrolytes having reduced dietary acid content (maximum chloride 2.0% dry weight) and a minimum of 1.0% phosphorus is combined in a fixed ratio so that when the protein concentration is 2.2 gm/100 cc (a normal concentration) the mineral requirements are met with better patient tolerance and acidosis is prevented from occurring.

A further object of the present invention is the provision of an improved dietary protein mineral module or core having improved patient tolerance useful in the treatment and diagnosis of chronic diarrhea, particularly of infancy.

Other and further features, advantages, and objects of the invention appear throughout.

DESCRIPTION OF PRESENTLY PREFERRED EMBODIMENTS

The improved dietary module or modular or core formula of the present invention is composed of a high quality protein and an improved array of electrolytes or minerals of reduced dietary acid content combined in a fixed ratio so that when the protein concentration is 2.2 gm/100 cc (a normal concentration) the mineral requirements are met. Acidosis prevents normal growth in infants. By providing a maximum of 2.0% dry weight chloride, the improved module neutralizes body acids thereby resulting in better growth than that observed with our original module, such as set forth in the article in the Journal of Pediatrics, Supra.

Sodium-calcium caseinate is presently preferred as the source of the protein because of its availability, stability, and good solubility in water. Any high quality protein or mixtures thereof can be used, that is, one which stable and has good solubility in water, for example, whey protein or soy protein.

To the dietary protein module the physician adds any type and amount of fat and carbohydrate the patient can tolerate. The kinds of fat most frequently used because of their availability are corn oil, if long-chain triglycerides are desired, or fractionated coconut oil, as a source of medium-chain triglycerides. Since fractionated coconut oil is deficient in linoleic acid, 3 ml of safflower oil are added to each liter of module to supply this essential fatty acid. Normally, the final concentration of fat ranges from about 3.5 to 4.5 gm/100 ml fluid volume.

The type and amount of carbohydrate to be added are determined by the gastrointestinal tolerance of the individual patient as tested by the presence of glucose and acid in the stools. The types of carbohydrates used most frequently include glucose (dextrose), sucrose (table sugar), and honey which contains 40.5% fructose, 34.2% glucose, 1.9% sucrose and 23.4% water. Final concentrations of carbohydrates range between about 5 and 7 gm/100 ml fluid volume.

The dietary protein mineral module is then brought to a liter volume preferably with sterile tapwater, which is preferred as a source of trace elements that are not in the core.

Since the dietary protein mineral module with fat and carbohydrate added does not contain vitamins, multivitamins with vitamin E are given to the patient as a supplement.

In use, a concentration of 1 gm/100 ml of final fluid volume of the dietary protein module is offered at first to test the patient's tolerance to the protein, such as casein. If this concentration is tolerated, the core formula is then increased to 3.0 gm 100 ml fluid volume. Fat is added next, first at 1.4 gm/100 ml fluid volume and then in increments of 1.4 gm/100 ml until a final concentration of 4.2 gm/100 ml fluid volume is achieved. Finally, carbohydrates, for example glucose, is added in the same manner starting at 1 gm/100 ml with increases of 1 gm/100 ml increments to a final concentration of 5 to 7 gm/100 ml fluid volume.

If a particular concentration causes acidic dairrhea, that concentration is either maintained or reduced slightly until the intenstine develops tolerance, and then is again advanced until the desired concentration is achieved. As a patient is weaned to the dietary protein mineral module, decisions about formula changes are based upon the frequency and quality of the stools. Nursing personnel note all stool volumes and check the pH, glucose, and reducing substance. The pH is tested easily by touching nitrazine paper to a fresh stool. Glucose is checked with glucose oxidase test tape. Reducing substance is determined by taking a small amount of stool and diluting it with twice its volume of water. Fifteen drops of this suspension are added to a Clinitest tablet (obtained from Ames Company), and the reducing substance concentration is determined by comparing the solution to the color chart provided. When the stool pH drops below 6.0 or glucose or reducing substance begins to appear in the stool, the formula is reduced to the previously tolerated mixture. If the infant can not tolerate the protein core alone, resort is made to total parental nutrition for 2 or 3 weeks and then an attempt is again made to wean the infant to the dietary protein mineral module.

It has been found satisfactory to make changes in the formula generally every 12 hours, so that a formula of relatively high caloric value is achieved very rapidly. Initially, most can tolerate a formula that is complete in protein and fat (i.e., 2.2 gm of protein and 4.2 gm of fat per 100 ml fluid volume) with glucose in quantities of 2 to 3 gm/dl. This formula has approximately 55 calories/100 ml. Until a full calorie density formula is tolerated, it is imperative that a solution with 10% dextrose be infused intravenously to prevent the occurance of hypoglycemia. With the incomplete dietary protein mineral module with fat as described above in conjunction with intravenous administration of gluclose, most infants are able to gain weight.

In order to prevent acidosis in infants, which prevents normal growth, it is essential that the chloride content of the module not exceed 2.0% dry weight. In addition, by providing a mininum of 1.0% dry weight phorphorus, and preferably 1.8%, improved results, that is better growth is obtained in infants.

All infants on total parental nutrition are weaned to oral feedings as described above. The transition from intravenous feeding to oral feeding is much easier with this technique. When the infants have tolerated a complete formula for several weeks, they are then given a conventional formula that most closely matches in composition the tolerated concentrations of the modular formula.

The following Table I sets forth a comparison of the original with a presently preferred, improved dietary protein mineral module of the present invention.

TABLE I

| APPROXIMATE ANALYSIS (% by dry weight) | | |
|---|---|---|
| | Improved | Original |
| Protein | 83.0 | 83.0 |
| Calcium | 2.1 | 1.4 |
| Phosphorus | 1.8 | 1.1 |
| Sodium | 1.0 | 0.6 |
| Potassium | 2.5 | 2.5 |
| Chloride | 2.0 | 4.0 |
| Magnesium | 0.13 | 0.13 |
| Iron | 0.020 | 0.020 |
| Zinc | 0.011 | 0.011 |
| Copper | 0.0027 | 0.0027 |
| Iodine | 0.001 | 0.001 |
| L-methionine | 0.11 | 0.11 |
| Moisture (approx.) | 6.0 | 6.0 |

The ingredients used to form the improved dietary protein mineral module of Table I and to provide the approximate analysis as there set forth are set forth in the following Table II.

TABLE II

| INGREDIENT | PERCENT BY DRY WEIGHT | |
|---|---|---|
| | Improved | Original |
| Calcium-sodium caseinate (Casein salt) | *87.0 | *87.0 |
| Potassium citrate | 4.1 | 2.0 |
| Calcium phosphate dibasic | 4.6 | 3.1 |
| Potassium chloride | 2.0 | 3.5 |
| Sodium chloride | 1.9 | 1.2 |
| Magnesium chloride hexahydrate | 0.9 | 1.5 |
| L-methionine | 0.11 | 0.11 |
| Ferrous sulfate | 0.11 | 0.11 |
| Zinc sulfate | 0.11 | 0.11 |
| Copper sulfate | 0.11 | 0.11 |
| Potassium iodide | 0.11 | 0.11 |

*Hydration varies with casein batch to approximately 100 gms.

As indicated previously, we have found that superior results are obtained by altering and improving the original modular or core formula disclosed in the above publication by decreasing the chloride content (2.0% dry weight, maximum) and providing a phosphorus content of at least 1.0% dry weight. A clinical tolerance study was conducted of the original dietary protein mineral module as published and of the improved dietary mineral module, both of which are set forth in Tables I and II. Eleven (11) subjects were studied. They received alternately the original and improved module. In the improved module, the phosphorus intake was increased and the acid load was decreased with respect to the original module as evidenced by the increase in serum $CO_2$ and serum phosphate in the blood of the subjects receiving the improved module, as shown in Table III. The acidosis in the children receiving the original module as revealed by the low $CO_2$ and phosphate and increased serum chloride was relieved with the improved module. The rise of serum bicarbonate clearly reflects better neutralization of acid within the body. As can be seen from Tables I and II, the improved formulation increases the amount of phosphorus while reducing the amount of chloride in the formula. The changes as seen in Table III are a direct result of this revised formulation.

As previously mentioned, acidosis prevents normal growth in infants. The neutralization of body acids with the improved formulation has resulted in better growth than that observed in the original, unimproved module.

While the improved dietary protein mineral module as set forth in Tables I and II is presently preferred, the minerals may be present in the ranges as set forth in the following Table IV.

TABLE IV

| INGREDIENT | APPROXIMATE ANALYSIS RANGE (% Dry Solids) |
|---|---|
| Protein | 70.0–90.0 |
| Fat | 0.0–0.1 |
| Calcium | 1.0–4.0 |
| Phosphorus | 1.0–4.0 |
| Sodium | 0.5–2.0 |
| Potassium | 0.5–4.0 |
| Chloride | 0.5–2.0 |
| Magnesium | 0.1–0.5 |
| Iron | 0.01–0.04 |
| Zinc | 0.01–0.05 |
| Copper | 0.001–0.01 |
| Iodine | 0.001–0.04 |
| L-methionine | 0.01–0.5 |
| Moisture | 0.001–10.0 |

EXAMPLE II

In this example, whey protein and soy protein, and mixtures of them alone and with casein were substituted for sodium-calcium caseinate in the module of Tables II and IV to provide the protein with comparable results. Also, while L-methionine is added to improve the biological quality of the casein, other amino acids can be supplemented to achieve substantially the same biological quality of other protein sources. The percentage protein in the core and in the final diluted product is the same regardless of protein source.

Accordingly, the present invention is well suited and adapted to attain the objects and ends and has the features and advantages set forth as well as those inherent therein.

While presently preferred embodiments of the invention have been given for the purposes of disclosure, changes can be made therein which are within the spirit of the invention as defined by the scope of the appended claims.

What is claimed is:

1. In a dietary protein mineral module, to which fat and carbohydrates are added to patient's tolerance, consisting essential of protein and minerals combined such that when mixed with water to provide a protein concentration of 2.2 gm/100 cc final volume in water

TABLE III

COMPARATIVE EFFECTS OF IMPROVED MODULE

| | ORIGINAL MODULE | | IMPROVED MODULE | | CHANGE DUE TO IMPROVEMENT | | |
|---|---|---|---|---|---|---|---|
| | NO. INFANTS | MEAN | NO. INFANTS | MEAN | NO. INFANTS | MEAN ± | SEM |
| Age, Month | *11 | 5.54 | 11 | 5.54 | | | |
| Serum Na, MEq/L | 10 | 138.9 | 10 | 140.0 | 10 | +1.1 | 1.2 |
| Serum K, MEq/L | 10 | 4.37 | 10 | 5.1 | 10 | +0.7 | 0.2 |
| Serum Cl, MEq/L | 10 | 109.6 | 10 | 106.0 | 10 | −3.6 | 2.8 |
| Serum $CO_2$, MEq/L | 10 | 16.2 | 10 | 18.8 | 10 | +2.6 | 1.1 |
| Serum Calcium, Mg/dL | 8 | 8.34 | 11 | 9.16 | 8 | +0.73 | 0.23 |
| Serum Phosphate, MM/L | 9 | 4.1 | 9 | 5.0 | 7 | +1.3 | 0.34 |
| ALK Phosphatase, U/L | 9 | 225.9 | 8 | 241.3 | 6 | −30.0 | 28.0 |
| SGOT, U/L | 9 | 35.4 | 9 | 55.9 | 7 | +19.0 | 26.0 |
| BUN, Mg/dL | 9 | 11.0 | 10 | 11.7 | 9 | +1.6 | 2.0 |
| Serum Mg, MEq/L | 8 | 2.08 | 4 | 2.08 | 4 | −0.03 | 0.15 |
| Body Weight, gms | 11 | 3728.0 | 11 | 3830.0 | 11 | +102.0 | 62.0 |
| Arm, FOC | 10 | 0.231 | 9 | 0.235 | 9 | +0.07 | 0.004 |

*Blood samples were not always available from each infant which accounts for less than eleven patients in portions of Table III. Eight patients, however, is scientifically sound and a basis for the results set forth in Table III.

will provide normal mineral requirements of a patient, the protein being present in an amount of from about 70% to about 90% dry weight, and the minerals comprising by dry weight from about 1.0% to about 4.0% calcium, from about 0.5% to about 2.0% sodium, from about 0.1% to about 0.5% magnesium, and trace amounts of iron, zinc, copper, iodine and L-methionine, the improvement comprising,
  including in the minerals from about 0.5% to about 2.0% chloride and from about 1.0% to about 4.0% phosphorus.

2. The module of claim 1 where,
  the protein is calcium-sodium caseinate.

3. The module of claim 1 where,
  the protein is whey protein.

4. The module of claim 1 where,
  the protein is soy protein.

5. The module of claim 1 where,
  the protein is calcium-sodium caseinate and is present in the amount of about 83%, and where by dry weight
  the calcium is present in an amount of about 2.1%,
  the phosphorus is present in an amount of about 1.8%,
  the sodium is present in an amount of about 1.0%,
  the potassium is present in an amount of about 2.5%, and the chloride is present in an amount of about 2.0%.

6. In a dietary protein mineral module, to which fat and carbohydrates are added to patient's tolerance, consisting essentially of protein and minerals combined such that when mixed with water to provide a protein concentration of 2.2 gm/100 cc final volume in water will provide normal mineral requirements of a patient, the protein being calcium-sodium caseinate and present in an amount of about 87% dry weight, the minerals comprising by dry weight about 4.1% potassium citrate, about 4.6% calcium phosphate dibasic, about 2.0% potassium chloride, about 1.9% sodium chloride, about 0.9% magnesium chloride hexahydrate, and trace amounts of ferrous sulfate, zinc sulfate, copper sulfate and potassium iodide, the improvement comprising,
  the minerals having a maximum chloride content of about 2.0% and phosphorus content of at least about 1.8%.

7. A method of providing nutrition to a patient comprising,
  feeding the patient the composition of claims 1 or 6 in water with added fats and carbohydrates in amounts up to the tolerance of the patient.

* * * * *